United States Patent [19]
Jen et al.

[11] Patent Number: 5,710,088
[45] Date of Patent: Jan. 20, 1998

[54] LEAN-$NO_x$ CATALYSTS CONTAINING SILVER SUPPORTED ON ALUMINA

[75] Inventors: Hung-Wen Jen, Troy; Haren Sakarlal Gandhi, Farmington Hills, both of Mich.

[73] Assignee: Ford Global Technologies, Inc., Dearborn, Mich.

[21] Appl. No.: 497,583

[22] Filed: Jun. 30, 1995

[51] Int. Cl.$^6$ .................................................. B01J 23/50
[52] U.S. Cl. .............................. 502/348; 423/239.1
[58] Field of Search ........................ 502/347, 348; 423/213.2, 239.1

[56] References Cited

U.S. PATENT DOCUMENTS

| | | | |
|---|---|---|---|
| 3,668,116 | 6/1972 | Adams et al. | 208/216 |
| 4,045,372 | 8/1977 | Warthen et al. | 252/463 |
| 4,225,341 | 3/1981 | Solomon | 260/348.34 |
| 4,239,656 | 12/1980 | Fujitani et al. | 252/462 |
| 4,455,393 | 6/1984 | Domesle et al. | 502/347 |
| 4,650,782 | 3/1987 | Onal | 502/339 |
| 4,886,582 | 12/1989 | Simpson | 502/211 |
| 5,106,802 | 4/1992 | Horiuchi et al. | 502/65 |
| 5,380,692 | 1/1995 | Nakatsuji et al. | 502/303 |
| 5,384,110 | 1/1995 | Muramatsu et al. | 423/239.1 |
| 5,589,432 | 12/1996 | Yoshida et al. | 502/325 |
| 5,593,933 | 1/1997 | Chattha et al. | 502/317 |

*Primary Examiner*—Glenn Caldarola
*Assistant Examiner*—Bekir L. Yildirim
*Attorney, Agent, or Firm*—Lorraine S. Melotik

[57] ABSTRACT

This invention is a catalyst comprising silver loaded on a particularly defined alumina for reducing nitrogen oxide from emissions generated by a lean-burn engine. The alumina has (i) a high surface area of at least 150 $m^2/g$, (ii) a small average pore diameter between 15 to 100 angstroms wherein at least 65% of the pore diameters are in the range of 15 and 100 angstroms, and (iii) pore diameters distributed in a narrow range such that at least 55% of the pore diameters are distributed in a 50 angstrom range.

7 Claims, 3 Drawing Sheets

LEAN-NO$_x$ CATALYSTS CONTAINING SILVER SUPPORTED ON ALUMINA

TECHNICAL FIELD

This invention relates to lean-NO$_x$ catalysts, particularly those having silver supported on a high surface area alumina (Al$_2$O$_3$) of controlled pore size to remove nitrogen oxides (NO$_x$) emissions from lean-burn internal combustion engines such as automobile engines.

BACKGROUND OF THE INVENTION

The Environmental Protection Agency has instituted stringent automobile-related environmental regulations. A primary focus of the regulation relates to the Corporate Average Fuel Economy (CAFE) standards, which mandate a specified, gradual increase of a corporate fleet's overall fuel economy by the established target dates. CAFE standards have spurred industry wide research and development of "lean-burn engines". The term "lean-burn engine" used herein is defined as an engine utilizing air/fuel mixtures having an oxygen content in excess of the stoichiometric air/fuel ratio (lean mixtures). The use of such lean air/fuel mixtures reduces the consumption of fuel and thus enhances an automobile's fuel economy. The effort to increase fuel economy has become paramount in the wake of the Environmental Protection Agency's tightening CAFE standards.

In addition to the CAFE standards, the Environmental Protection Agency has set a schedule for the continual reduction of specific automotive emissions. Thus, the Environmental Protection Agency's regulatory measures have required the automobile industry to simultaneously increase fuel economy while decreasing harmful exhaust emissions. Accordingly, there exists a new found interest in the development of a catalyst to operate efficiently under lean-burn conditions.

Many of the prior art catalysts were designed to optimally operate at or about stoichiometric conditions. These prior art catalysts when combined with a lean fuel mixture result in O$_2$ being adsorbed by the catalyst, preventing NOx from being reduced to nitrogen (N$_2$) by the active metal on the catalyst. So while the current three-way catalyst, for example, may effectively reduce NO, hydrocarbon (HC) and CO emissions at stoichiometric conditions, the efficiencies of a three-way catalyst for NO$_x$ reduction diminish significantly in an oxygen rich environment.

The effectiveness of a catalyst is largely dependent on the air/fuel ratio of the fuel mixture which is employed in an engine. If a lean mixture is utilized, a catalyst exhibits a high activity of oxidation but a low activity of reduction, while the combustion product contains a large amount of oxygen. In contrast, in the presence of a fuel rich mixture, a catalyst exhibits a high activity of reduction but a low activity of oxidation. At stoichiometric air/fuel ratios, oxidation and reduction are balanced.

Accordingly, there is a need for a lean-NOx catalyst which efficiently reduces NO$_x$ emission in the presence of a lean fuel mixture. In addition to automotive applications, lean-NO$_x$ catalysts are also valuable in lowering the emissions of stationary power plants that burn fossil fuels. A lean-NO$_x$ catalyst is defined for this application as a catalyst that can reduce NO$_x$ under lean-burn conditions.

In answer to this problem, transition metal-containing zeolite catalysts have been developed to reduce NO$_x$ emissions for lean mixtures. In particular, copper-zeolite catalysts have been preferred due to the large surface area of the zeolite to disperse copper (Cu) and the well controlled pore size of the zeolite to interact with reactants.

Zeolites are crystalline aluminosilicates. Zeolites are commercially available and are characterized by crystal structures having different channels or pore diameters. Hydrocarbons can interact strongly with the zeolite surface inside the pores or the channels. The basic principle behind removing NO$_x$ in a lean fuel mixture with a transition metal, e.g. Cu, relies on adsorbing NO$_x$ on the metal and effectuating a catalytic reaction between the adsorbed NO$_x$ with the hydrocarbons contained in the exhaust gas. A zeolite catalyst can enhance the catalytic reaction by providing high surface area and unique pore structure.

Although copper-zeolite catalysts have good catalytic activity, initially, the catalysts degrade at high temperatures and in the gas mixtures usually found in automotive exhaust systems. If the zeolite catalyst is exposed to steam-containing gas mixture, e.g. automotive exhaust, the activity of the catalyst decreases rapidly. The decrease in the activity is accompanied by dealumination that changes the framework of the zeolite. Steam deactivation is the primary reason why such catalysts are not practical in application.

Alumina (Al$_2$O$_3$) is more stable than zeolite, because Al$_2$O$_3$ has been used in three-way catalysts as support for active ingredients. The use of Al$_2$O$_3$ and metal containing Al$_2$O$_3$ as lean-NOx catalysts has been reported by H. Hamada and et. al. in *Applied Catalysis*, L1–L8 (1991). Alumina, however, is inefficient in NO$_x$ reduction and it is currently impractical for commercial use.

In U.S. patent application Ser. No. 08/311,298 filed Sep. 23, 1994 and commonly assigned with this invention, it was found that sol-gel processed alumina membrane could be used as support for lean-NO$_x$ catalysts and provide good nitrogen oxide reducing activity when loaded with, for example, silver. Manufacturing of such membranes, however, is complex and costly. The present invention aluminum oxide materials overcome such deficiencies in that they are easily prepared. Further, when loaded with silver, such aluminum oxide materials having outstanding catalytic ability to reduce nitrogen oxides in lean burn exhaust gases.

SUMMARY OF THE INVENTION

The present invention is a catalyst for reducing the nitrogen oxide emissions from the exhaust stream of an internal combustion engine operated in an oxygen rich environment. The catalyst comprises silver loaded onto aluminum oxide. In particular, the aluminum oxide (i) has a high surface area of at least 150 m$^2$/g, (ii) a small average pore diameter between 15 to 100 angstroms wherein at least 65% of the pore diameters are in the range of 15 and 100 angstroms, and (iii) pore diameters distributed in a narrow range such that at least 55% of the pore diameters are distributed in a 50 angstrom range. Preferably, greater than 50 weight percent of the aluminum oxide is gamma-alumina and the silver is loaded in an amount of between 1 and 20 weight percent of the catalyst. The internal combustion engine may be an automotive engine.

According to another embodiment of the invention, the invention is directed to a method of reducing the nitrogen oxides from the exhaust of such lean burn engines.

Advantageously, in addition to the relatively ease and low cost associated with the manufacture of the present invention aluminum oxide, the aluminum oxide supported silver catalysts have excellent performance and better hydrothermal stability than zeolite-based catalysts. We have unexpected found that the excellent catalytic properties of the catalyst rely significantly on the necessary physical characteristics of the aluminum oxide as disclosed above. That is, the surface area, pore size, and pore size distribution of the aluminum oxide are critical to the catalyst effectiveness to reduce nitrogen oxides in an oxygen rich exhaust gas.

BRIEF DESCRIPTION OF THE DRAWINGS

FIGS. 1–5 graphically depict the pore-size (diameter) distributions using standard BJH $N_2$-desorption technique of the alumina of examples 1–5, respectively. The alumina of FIGS. 1–3 are according to embodiments of the present invention while FIGS. 4 and 5 are comparative examples not according to the present invention.

BEST MODE FOR CARRYING OUT THE INVENTION

Figure 1:
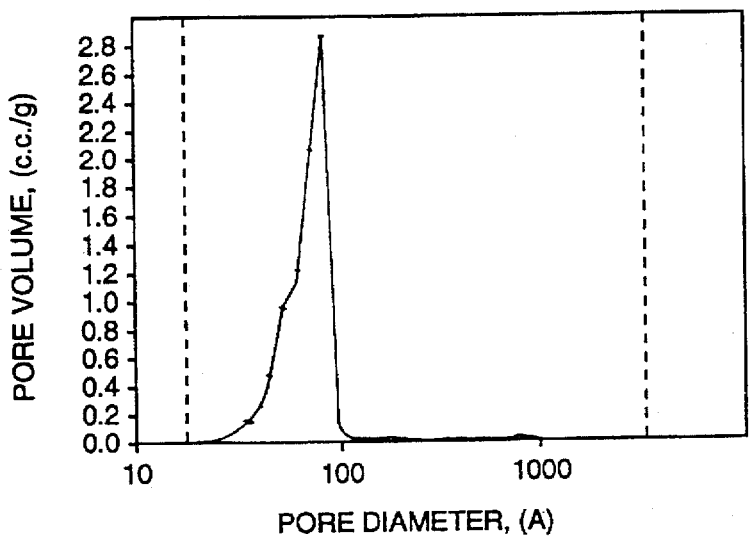

The present invention catalyst comprises silver loaded on a particularly defined alumina (aluminum oxide). We have found that in order to provide a catalyst useful to efficiently remove nitrogen oxides from lean-burn engine exhaust gases, the alumina must have special physical characteristics. These characteristics are defined in more detail in the following paragraphs.

Alumina or aluminum oxide, $Al_2O_3$, used in catalysts is generally porous and has substantial surface area. Gamma, $\gamma$-$Al_2O_3$ is the most commonly used type and is preferred for this invention, in part or as the entire alumina. Preferably, the invention alumina comprises at least 50 weight % gamma alumina. It can be prepared by dehydration of hydrous aluminum oxides, AlO (OH) or $Al(OH)_3$, at an appropriate temperature. The structure of $\gamma$-$Al_2O_3$ can be regarded as a "defect spinel structure". High surface area enables the spread of the active metal ions during the impregnation process. The structure defect of $\gamma$-$Al_2O_3$ can have strong interaction with the active metal species and prevent the sintering of the active metal sites. Therefore, high dispersion of the active metal sites can be achieved by using high surface area $\gamma$-$Al_2O_3$ as support.

In the present invention, alumina with surface area larger than 100 $m^2$/g is necessary, preferably the surface area is larger than 150 $m^2$/g. In addition, our invention alumina is required to have a defined pore structure. For a highly dispersed catalyst, the majority of the active metal sites are on the wall inside the pore. The pore size (diameter) hence have a great influence on the diffusion in and out of the pore, and on the interaction of the reactants or products with the catalyst surface inside the pore. It is critical that the average pore diameter is relatively small, between 15 to 100 Å (angstroms) wherein at least 65% of the pores have a diameter which is between 15 and 100 Å. The distribution of the pore diameter for the $Al_2O_3$ in this invention is required to be in a narrow range. That is, at least 55% of the pores are populated in a 50 angstrom (Å) range (spread).

The pore size distribution and surface area of an alumina can be controlled through starting materials, preparation processes, and activation temperature. In a preferred embodiment, the type of alumina used mostly was prepared from psuedo-boehmite, a form of AlO(OH). Boehmite can be made by hydrolyzing aluminum alkoxides, e.g. $Al(OC_2H_5)_3$, and drying. Boehmite can then be heated in air at 550° C. for 3 hours to form $\gamma$-$Al_2O_3$. One sample $\gamma$-$Al_2O_3$, that of Example 1, was prepared via this method. The surface area is 226 $m^2$/g with an average pore size of 64 Å. Boehmite can also be prepared by rehydration of aluminum oxides obtained from the aluminum mineral or pyrolysis of aluminum (Example 2).

The surface area and pore-size distribution of the $Al_2O_3$ samples herein can be measured in various ways as would be apparent to those skilled in the art in view of the present disclosure. In this work, they were determined via volumetric adsorption and desorption technique using BET equation and BJH desorption equations for data analysis.

The following examples of $Al_2O_3$ supported Ag catalysts were prepared using wet incipient impregnation method. A solution containing known amount of soluble Ag-salt and $HNO_3$ was first made. Under vigorous stirring, a sample of $Al_2O_3$ was added into the solution. The ratio of $Al_2O_2$-) weight:solution-volume is 1 gram:1.3 ml. The resulted slurry was heated gently to evaporate $H_2O$ till the slurry turned into paste. The paste was then dried at 55° C. for 10 hours. The dried sample was finally heated in air inside a furnace at 120° C. for 4 hours and subsequently at 550° C. for 4 hours.

In the following examples, the activity of the catalysts (alumina loaded with silver) for lean-$NO_x$ reduction was tested in a flow reactor system. The reaction mixture consisted of 10% $O_2$, 550 ppm NO, 1100 ppm C3 ($C_3H_6/C_3H_6$= 2), and helium as balance. The total flow of the gas mixture was 0.5 liter/minute. During the activity measurement, 0.040 ml/min liquid $H_2O$ was injected into a heated pathway of the gas mixture before the mixture reaching the catalyst bed. The resulted content of steam was 9%. If necessary, a small flow of $SO_2$/He was added into the reaction mixture to attain 18 ppm $SO_2$ concentration. The amount of catalyst used was typically 0.2 gram. The $NO_x$ concentration was monitored through a chemiluminescence $NO_x$-analyzer.

EXAMPLE 1

$\gamma$-alumina was prepared by the hydrolysis of aluminum ethoxides, $Al(OC_2H_5)_3$, according to the process described above. Surface area of the alumina is 226 $m^2$/g. FIG. 1 shows the uniform, narrow pore-size distribution of the alumina. As can be determined from the figure, 95% of the pores are populated in a narrow 50 Å range. The average pore size is 64 Å and 98% of the pores are between 15 and 100 Å.

A 2 wt % silver catalyst, Catalyst-1, was prepared via the impregnation method described above. 2.6 ml solution containing 0.2 ml concentrated $HNO_3$ and 0.04 gram Ag from $AgNO_3$ was used for 2.0 gram $Al_2O_3$-1.

EXAMPLE 2

Figure 2:
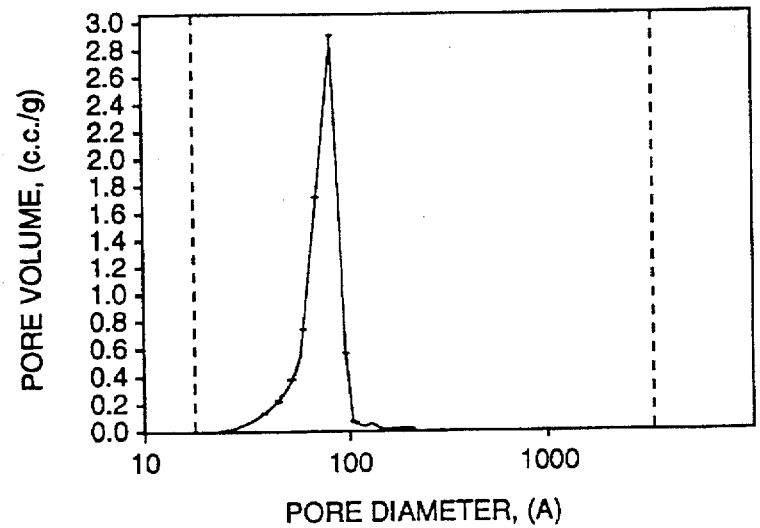

$Al_2O_3$ was prepared from the rehydration of aluminum oxides formed from the pyrolysis of aluminum. The surface area is 182 $m^2$/g. This alumina has a narrow pore-size distribution curve (FIG. 2) with 88% of the pore size populated in a 50 Å range. The average pore size is 71 Å with 97% of the pores being between 15 and 100 Å.

Catalyst-2, a 2 wt % Ag catalyst supported on $Al_2O_3$-2, was prepared in the same way as Catalyst-1.

EXAMPLE 3

Figure 3:
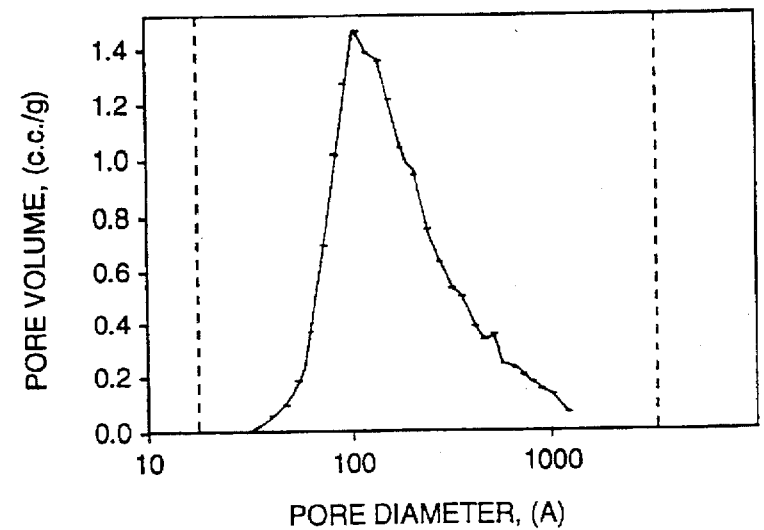

A commercial $Al_2O_3$ (Monal Gel obtained from Alcoa Co.) with a high surface area of 275 $m^2$/g was used. The pore-size distribution curve of this alumina is illustrated in FIG. 3 which shows a tailing into the large pore range. Although the average pore-size is 55 Å, there is only 67% of the pore in between 15 and 100 Å. The most populated 50 Å range consisted of 59% of the total pores.

Catalyst-3, containing 2 wt % Ag on $Al_2O_3$-3, was prepared via the same procedures as Catalyst-1.

EXAMPLE 4

Figure 4:
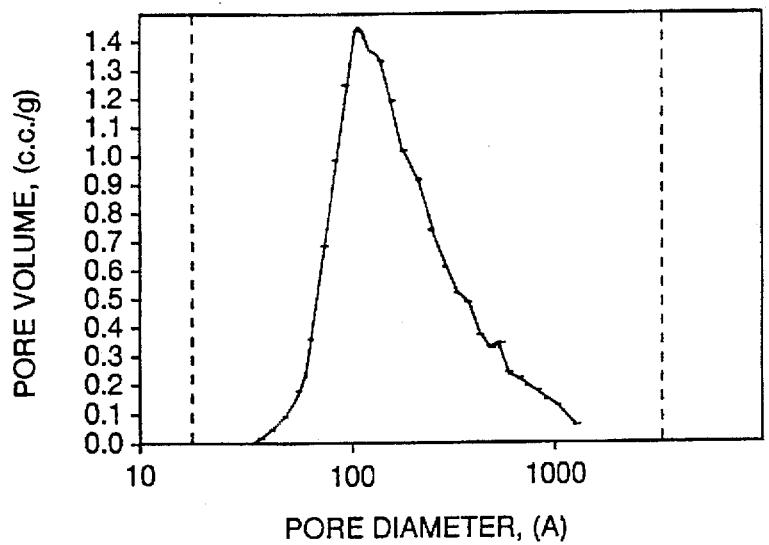

A commercially available $Al_2O_3$ (MJ 386 from W. R. Grace Co.) was obtained for use. The surface area is 192 $m^2/g$. The average pore-size (was?)is 133 Å with only 15% of the pores in between 15 and 100 Å. The $Al_2O_3$ has a broad pore-size distribution curve (FIG. 4). Only 42% of the pores lie in the most populated 60 Å range. Hence, this alumina is not according to the present invention.

Catalyst-4 (comparative catalyst) was prepared from this alumina according to the procedure in Example 1, except that the solution contained 0.08 gram Ag. The resulted catalyst has a Ag-loading of 4 wt %.

EXAMPLE 5

Figure 5:
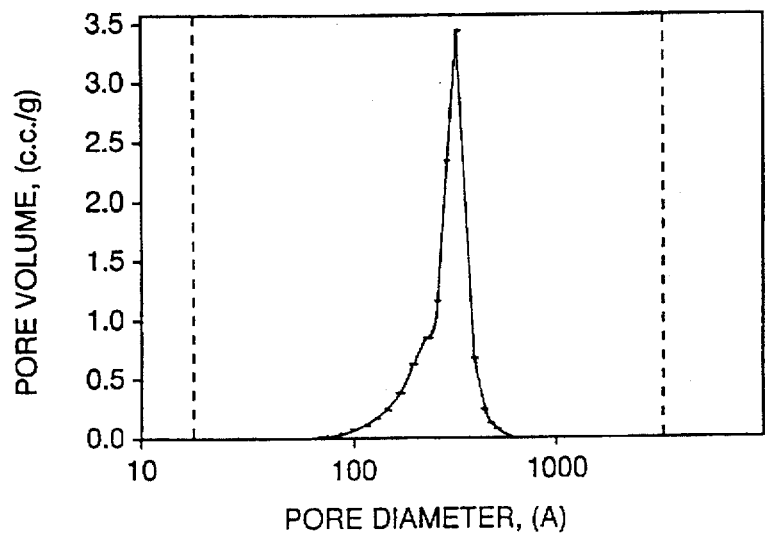

The $Al_2O_3$-5 used in this example is the type of $Al_2O_3$ used in many of current three-way catalysts. The surface area is 92 $m^2/g$. The pore-size distribution is narrow with 63% of the pores in the most populated 73 Å range (FIG. 5). The average pore size is 219 Å with only 3% of the pores in between 15 and 100 Å. This alumina is not according to the present invention.

Catalyst-5 (comparative catalyst) with 2 wt % Ag was prepared using the $Al_2O_3$ of this example following the procedure in Example 2.

TABLE 1

| | Properties of Alumina Used | | | | |
|---|---|---|---|---|---|
| | Ex. 1 | Ex. 2 | Ex. 3 | Ex. 4 | Ex. 5 |
| S, ($m^2/g$) | 226 | 182 | 275 | 192 | 92 |
| AV. pore size (Å) | 64 | 71 | 55 | 133 | 219 |
| % of Pore 15 Å<, >100 Å | 98% | 97% | 67% | 15% | 3% |
| % of pore in most populated 50 Å range | 95% | 88% | 59% | 42% | 63% |

Effect of Pore Size and Surface Area

The physical properties (surface area and pore size and distribution) of the alumina of the $Al_2O_3$/silver catalysts of Examples 1-5 are shown in Table 1. The efficiencies of $NO_x$-conversion for the corresponding catalysts are given in Table 2.

As can be seen from these tables, Catalyst-1 and Catalyst-2 (both according to embodiment of the present invention) had the highest efficiencies of $NO_x$-reduction. The surface area is high and the pore-size distribution is uniform and narrow for either catalyst. The average pore size is in the range between 15 and 100 Å.

Catalyst-3, also according to the present invention, also had good efficiency for $NO_x$-reduction, but the efficiency is lower than that for Catalyst-1 or Catalyst-2. The lower activity can be attributed to the spreading of substantial portion of the pores into the range bigger than 100 Å. The distribution is less concentrated in a small range. Although the average pore-size is small and the surface area is the largest of all catalysts, the activity for $NO_2$-reduction suffered due to the pore-size distribution.

Catalyst-4 (comparative example) has a broad pore-size distribution curve and the average pore size is 133 Å. The efficiency of $NO_x$-conversion was the lowest of all five catalysts in Table 2. Catalyst-5, a comparative example using alumina typical of that used for catalyst supports, had a narrower pore-size distribution than Catalyst-4, but the average pore size of 219 Å is very large, and outside that of the present invention alumina. The surface area of 92 $m^2/g$ was the smallest of all the catalyst. As can be seen, the efficiency for $NO_x$-reduction was poor.

Examples 6-8 were made according to embodiment of the present invention to demonstrate the effects of silver loading in the catalyst on the nitrogen oxide reduction efficiency.

EXAMPLE 6

Catalyst-6 was prepared using the same $Al_2O_3$ as that of Example 1 and the same impregnation method as used to prepare Catalyst-1, except that the solution contained 0.02 gram Ag. This resulted in 1 wt % Ag supported on $Al_2O_3$-1.

EXAMPLE 7

Catalyst-7 was prepared in the same way as Catalyst-1 in Example 1, except that the impregnation solution had 0.06 gram Ag which resulted in a catalyst with 3 wt % Ag-loading.

EXAMPLE 8

Catalyst-8 containing 4 wt % Ag was prepared according to the procedure in Example 1, except that the impregnation solution had 0.08 gram Ag.

Effect Of Ag-Loading

Table 2 compares the activities for $Al_2O_3$-1 supported Ag catalysts with loading from 1 to 4 wt %. The catalysts all had good activity for $NO_x$-conversion.

TABLE 2

| Catalyst | wt % Ag | % NOx-conversion |
|---|---|---|
| 6 | 1% | 70.4% |
| 1 | 2% | 91.0% |
| 7 | 3% | 81.4% |
| 8 | 4% | 76.7% |

Figure 6:
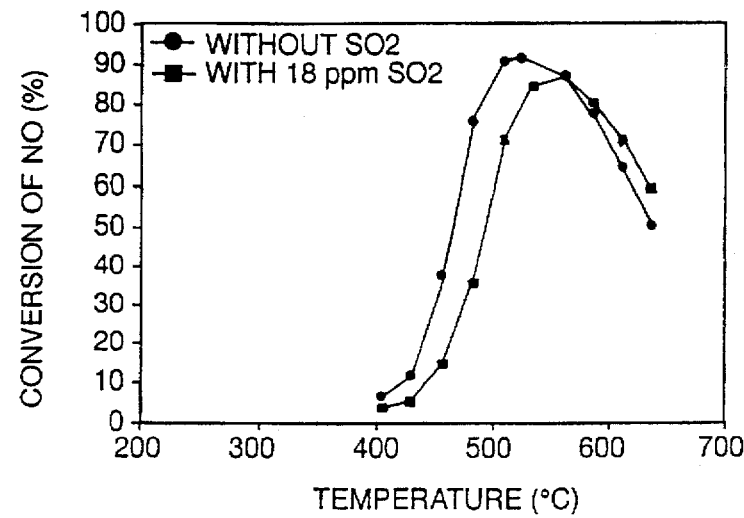
FIG. 6 is a graphic comparison between the $NO_x$-conversions in the presence and absence of $SO_2$ for a Ag-containing $Al_2O_3$ catalyst according to an embodiment of the present invention.

The (maximum) efficiency of $NO_x$-conversion for Catalyst-1 is shown in FIG. 6. The addition of 18 ppm $SO_2$ into the gas mixture being treated by the catalyst had little effect on the high efficiency of $NO_x$-conversion. Thus, contrary to conventional catalysts whose efficiency is significantly lowered by sulfur dioxide present in the exhaust stream, the catalytic activity of the present invention catalyst is not impacted. This is a particularly important advantage of the present invention catalyst.

TABLE 3

NOx-Efficiency of Silver/Alumina Catalysts

| Catalyst- | % NOx-Conversion | | | | |
|---|---|---|---|---|---|
| | 1 | 2 | 3 | 4 | 5 |
| 0 ppm SO2 | 91% | 87% | 76% | 40% | 44% |
| 18 ppm SO2 | 85% | 85% | 68% | 42% | 59% |

Durability

Figure 7:
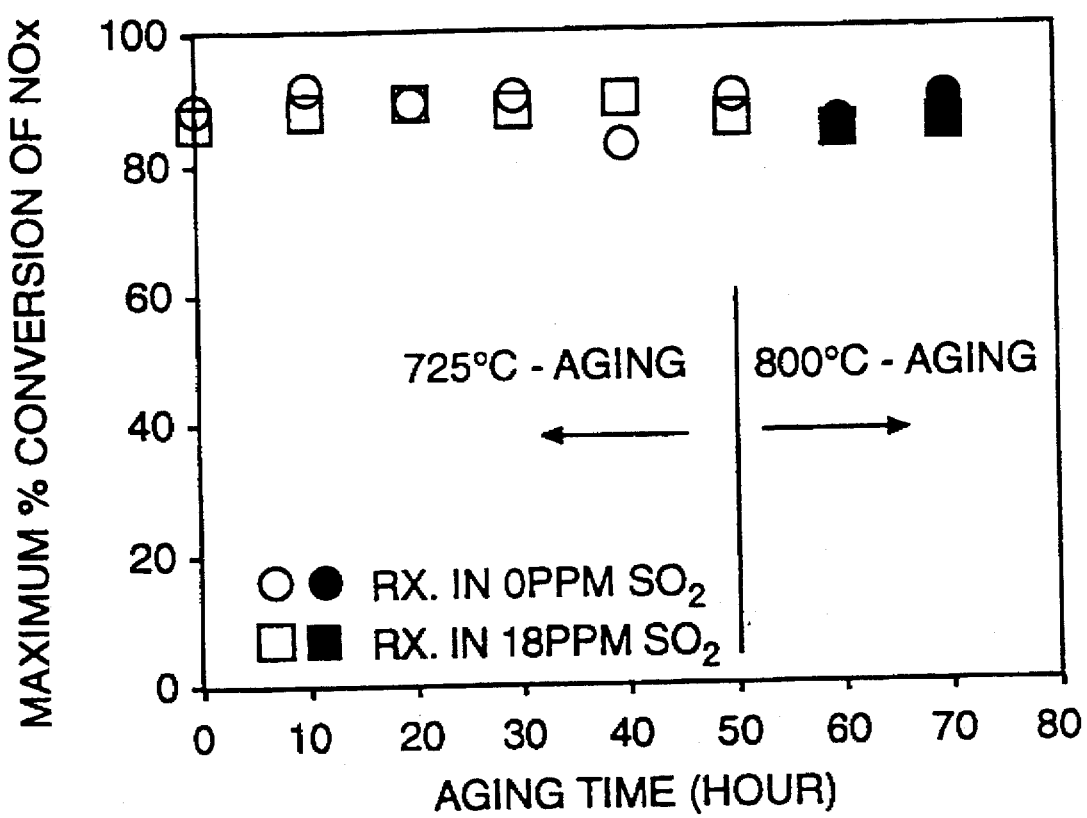
FIG. 7 is a plot of $NO_x$-conversion efficiency against aging time at 725° C. and 800° C. for a Ag-containing $Al_2O_3$ catalyst according to the present invention.

FIG. 7 shows the nitrogen oxide conversion efficiency of Catalyst-1 against with time (aging) in a flow of gas mixture containing 18 ppm $SO_2$. After 50 hours at 725° C. and then an additional 30 hours at 800° C., there was little change in the $NO_x$-conversion efficiency. The catalyst thus displayed excellent durability characteristics.

We claim:

1. A catalyst for reducing the nitrogen oxide emissions from the exhaust stream of an internal combustion engine operated in an oxygen rich environment, said catalyst consisting essentially of:

silver loaded onto aluminum oxide in a range of 1 to 20% of the overall weight, said aluminum oxide (i) having a high surface area of at least 150 m²/g, (ii) a small average pore diameter between 15 to 100 angstroms wherein at least 65% of the pore diameters are in the range of 15 and 100 angstroms, and (iii) pore diameters distributed in a narrow range such that at least 55% of the pore diameters are distributed in a 50 angstrom range.

2. The catalyst according to claim 1 wherein the aluminum oxide comprises greater than 50 weight percent gamma-alumina.

3. The catalyst according to claim 2 wherein the aluminum oxide consists of gamma-alumina.

4. The catalyst according to claim 1 wherein the average pore size is greater than 50 angstroms.

5. The catalyst according to claim 1 wherein said silver is loaded on the aluminum oxide in a range of less than 4% of the overall weight.

6. The catalyst according to claim 1 wherein said internal combustion engine is an automotive engine.

7. A catalyst for reducing the nitrogen oxide emissions from the exhaust stream of an internal combustion engine operated in an oxygen rich environment, said catalyst consisting essentially of:

silver loaded onto aluminum oxide in a range of 1 to 20% of the overall weight, said aluminum oxide being gamma-alumina and (i) having a high surface area of at least 150 m²/g, (ii) a small average pore diameter between 15 to 100 angstroms wherein at least 65% of the pore diameters are in the range of 15 and 100 angstroms, and (iii) pore diameters distributed in a narrow range such that at least 55% of the pore diameters are distributed in a 50 angstrom range.

* * * * *